Nov. 14, 1950  G. A. MANEY  2,529,619
AERIAL NAVIGATION SYSTEM
Filed Sept. 4, 1944  3 Sheets-Sheet 1
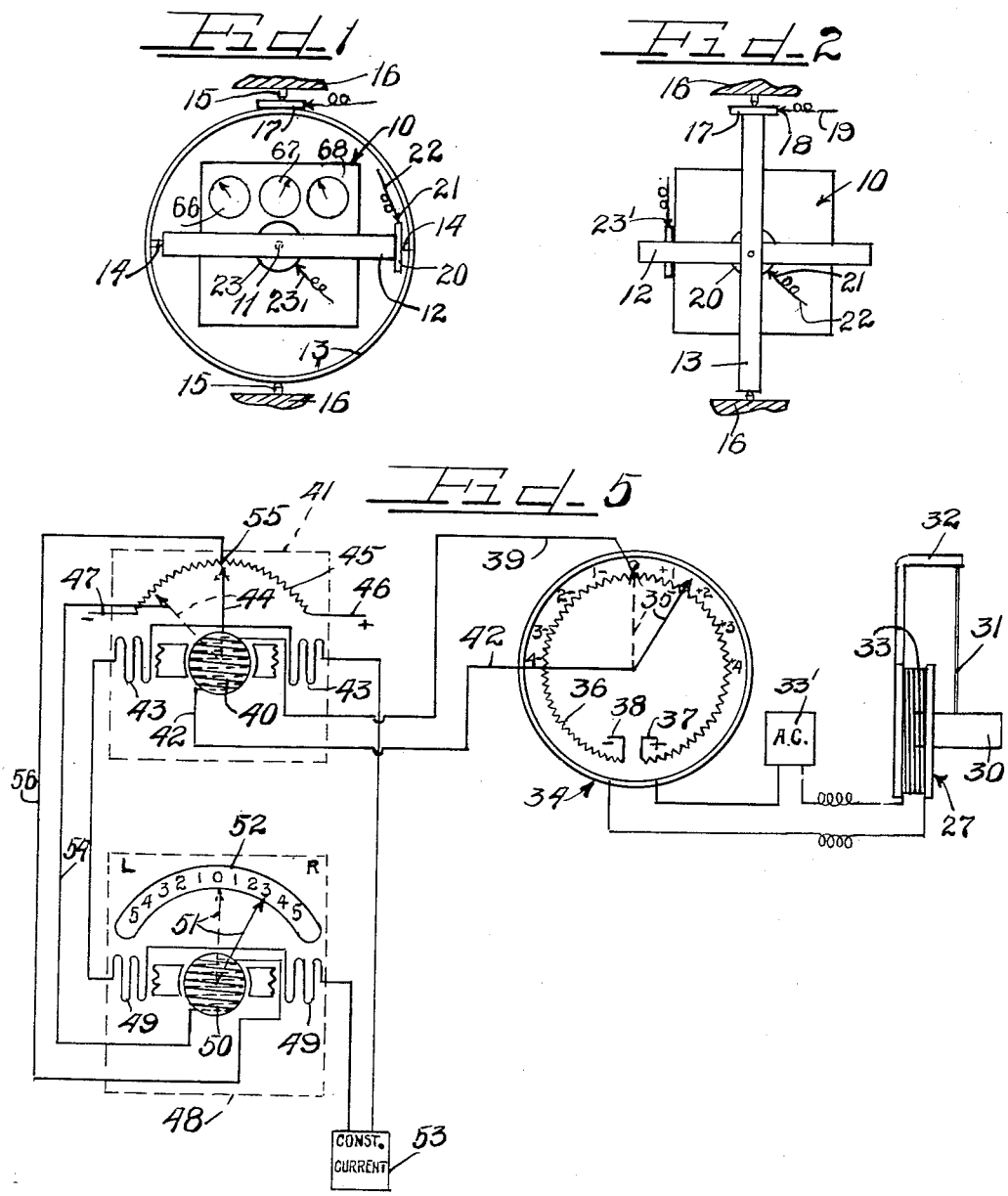

Nov. 14, 1950  G. A. MANEY  2,529,619
AERIAL NAVIGATION SYSTEM
Filed Sept. 4, 1944  3 Sheets-Sheet 2
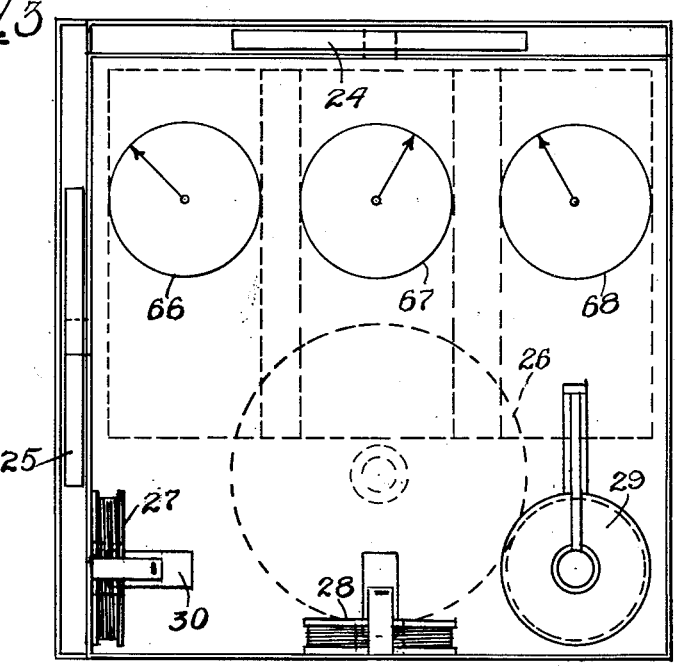
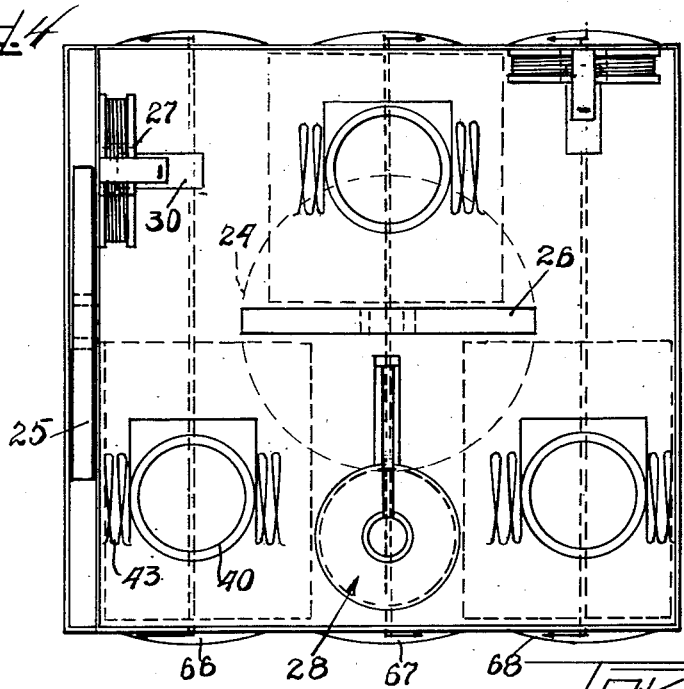
Inventor
George A. Maney
by Charles H. Hill
Attys.

Nov. 14, 1950        G. A. MANEY        2,529,619
AERIAL NAVIGATION SYSTEM
Filed Sept. 4, 1944                              3 Sheets—Sheet 3
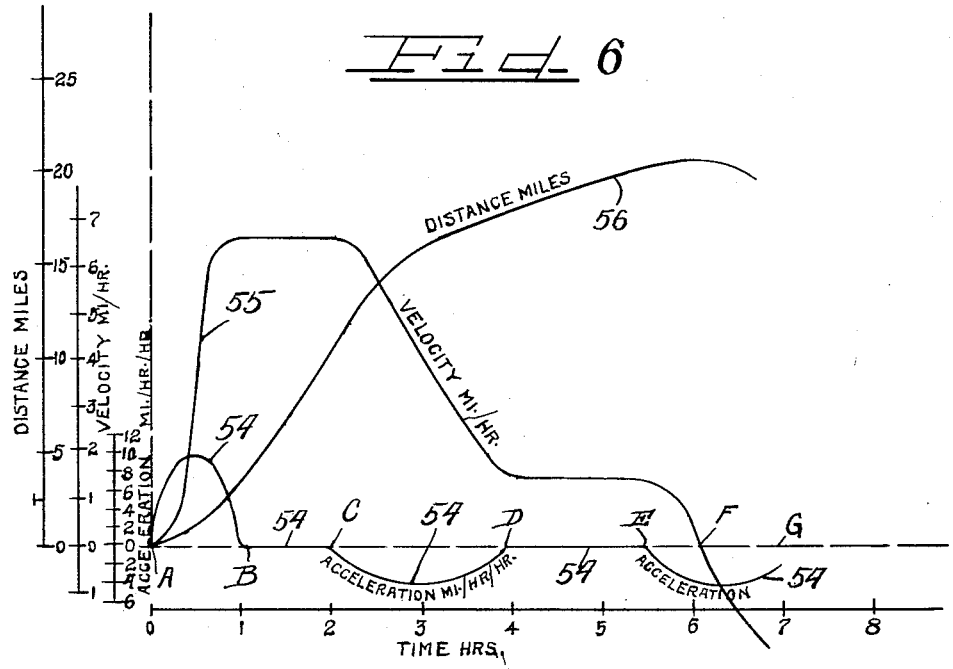
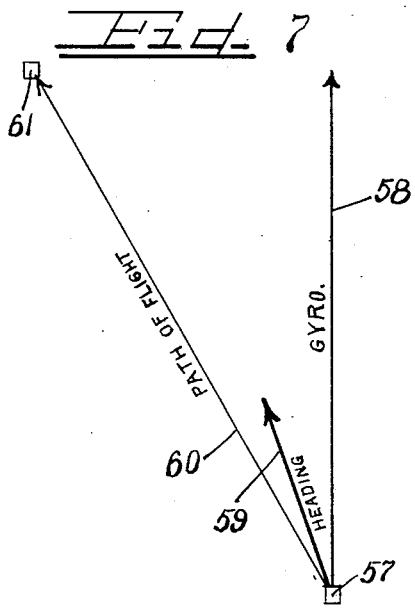
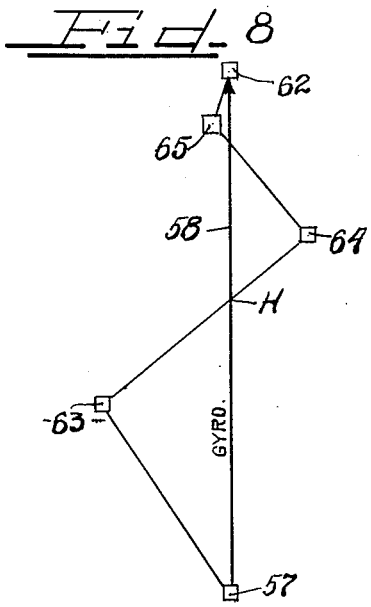
Inventor
George A. Maney
by Charles A. Wells Attys.

Patented Nov. 14, 1950

2,529,619

UNITED STATES PATENT OFFICE 2,529,619

AERIAL NAVIGATION SYSTEM

George A. Maney, Skokie, Ill.

Application September 4, 1944, Serial No. 552,620

2 Claims. (Cl. 264—1)

This invention relates to a navigation system and method, and more particularly to a novel method and means for providing a continual indication of the exact position of an aircraft or other vehicle without reliance upon any equipment or energy source other than that located on the vehicle.

Many systems have been devised in the past for providing aerial aid to navigation. Radio direction finders have been provided which enable a pilot to know his bearing with respect to a fixed point on the ground. These have been a means of providing a "homing" system. Other systems have been provided which enable a pilot to follow a desired course which is laid out and defined by radio transmitters located on the ground.

Various means have also been provided for giving vertical guidance by propagating energy from fixed points on the ground.

It is one of the principal features of the present invention to provide an entirely different type of system and method which will enable a pilot to know at all times his exact position. The novel system and method of the present invention is predicated on instruments which accurately record acceleration and deceleration. When means for determining acceleration and deceleration in three different directions at right angles to each other is combined with a gyrocompass, it is possible to double-integrate the acceleration and provide a cumulative reading indicating the departure in all three directions from a preselected course originating at a predetermined starting point.

It is an object of the present invention to provide a novel navigation system and method involving double integration of acceleration in one or more directions at right angles to each other.

A further object of the present invention is to provide a novel navigation system which at all times provides an indication for the pilot which will enable him to know his exact location with reference to a preselected course.

Another object of the present invention is to provide novel means for giving a continuous indication of the departure of an aircraft or other body in any direction from any preselected course.

A still further object of the present invention is to provide a novel navigation system and method which requires no equipment on the ground but carries everything necessary for a pilot to know his location on the aircraft or other body.

Another and still further object of the present invention is to provide a novel navigation system and method including a gyrocompass and at least one accelerometer and double-integrating watt hour meter.

The novel features which I believe to be characteristic of my invention are set forth with particularity in the appended claims. My invention itself, however, both as to its organization, manner of construction and method of operation, together with further advantages and objects thereof, may best be understood by reference to the accompanying drawings, in which:

Figure 1 is a diagrammatic front elevational view of an instrument embodying the novel principles and teachings of the present invention mounted in a cubicle container and pivotally supported for movement about the three principal coordinate axes;

Figure 2 is a side elevational view of the instrument container and mounting shown in Figure 1;

Figure 3 is a diagrammatic enlarged front elevational view showing the relative location of the principal elements of the instrument within its cubicle container;

Figure 4 is a diagrammatic top view of the cubicle container showing the relative position of the principal elements of the instrument.

Figure 5 is a diagrammatic wiring diagram showing the accelerometer and the means for double-integrating the movement thereof;

Figure 6 is a graph illustrating what might take place during a portion of a flight with one accelerometer and double-integrating unit;

Figure 7 is a diagrammatic illustration showing the actual path of flight of an aircraft with respect to the heading of the aircraft and also with respect to the setting of the gyro compass; and Figure 8 is a diagrammatic illustration illustrating how a pilot, in advance, may map out any desired path of flight and follow the same to a plurality of different intermediate points.

In Figures 1 to 4 of the drawings, an illustrated embodiment of the invention is shown for an aerial navigation system. The instruments of the system are housed within a cubicle container 10 which is pivotally mounted as at 11 in a frame 12. The frame 12 is pivotally mounted in a second frame or ring 13 by pivots 14. The axis of rotation of the pivotal connection 14 between the frame 12 and the frame 13 is at right angles to the axis of rotation afforded by the pivotal connection 11 between the cubicle container 10 and the frame 12. The frame 13 in turn is pivotally supported as at 15 to the fixed structure 16 which may be any part of the aircraft or other body on which the instrument is mounted. The pivotal connection 15 provides an axis of rotation which is at right angles to both the axis of rotation 14 as well as the axis of rotation 11. As is indicated in Figure 2 of the drawings, the frame 13 carries an electrical contact ring 17 which is wiped by a brush 18. The brush 18 is electrically connected to a source of energy (not shown) through a conductor 19. A similar electric contact ring 20 is provided on the frame 12 and is electrically engaged by a brush 21 connected through an electrical conductor 22. The cubicle container 10 is provided with an electric contact ring 23 which is also equipped with a brush 23'.

As is shown in Figures 3 and 4, three gyroscopes 24, 25 and 26 are rotatably mounted in the housing 10. The gyroscope 24 is for the horizontal, or X-plane. The gyroscope 25 is for the Y-plane, while the gyroscope 26 is for the Z-plane. These gyroscopes 24, 25 and 26 are continually rotated (in any suitable electrically driven manner) in order that the housing 10 will maintain its same orientation after it has once been set irrespective of movements of the aircraft in any direction. This maintenance of constant orientation is well known to those skilled in the gyrocompass art and for that reason need not be further described herein. It is sufficient to state that this provides a fixed reference system for the instruments now to be described.

Three accelerometers, 27, 28 and 29, are provided in the housing 10 for continuously measuring acceleration and deceleration in three directions at right angles to each other. As will presently be explained, the accelerometers 27, 28 and 29 register acceleration and deceleration in lateral departure, in altitude and in trip progress respectively.

Each of the accelerometers 27, 28 and 29 has associated therewith a pair of watt hour meters which double integrate the registered values of acceleration and deceleration and give a continuous cumulative reading of departures along three coordinate axes from a fixed starting point. This will be understood more clearly when it is remembered that the first integration of acceleration is velocity; while the second integration of acceleration is distance. To simplify the present description, only one of the three accelerometers and its associated integrating instruments will be described. It is to be understood, however, that the other accelerometers have similar instruments associated with each of them.

Now referring to Figure 5, the accelerometer 27 is illustrated as being of the pendulum type in which a soft iron armature 30 is suspended through a thin strip 31 from the frame member 32. A coil 33 is mounted in close proximity to the armature 30. The coil 33 is connected to a suitable source of alternating current 33' and to a galvanometer 34 having a movable arm 35, which is normally urged in a counterclockwise direction by resilient biasing means (not shown) but maintained in a zero instrument position (which is its half-way position as shown in Figure 5) by the normally constant current supplied from the source 33'. The movable arm 35 extends into engagement with an arcuately disposed resistance element 36 which forms a potentiometer. The two ends of the resistance element 36 are connected to conductors 37 and 38 which are connected to a suitable source of electric energy herein indicated as a source of direct current. The arm 35 normally has a zero position, as indicated by the dotted lines in Figure 5, when current is flowing through the coil 33 and the galvanometer 34, and when the armature 30 is in its normal position unaffected by accelerating or decelerating forces. This position on the potentiometer 36 represented by the zero position of the arm 35 is connected through a conductor 39 to the voltage coil 40 of a first integration watt hour meter 41. The other side of the coil 40 is connected through a conductor 42 to the movable arm 35. The watt hour meter 41 is any suitable electrical watt hour meter, which, in addition to the voltage coil 40 has a conventional current coil 43. The movable element of the watt hour meter is represented by the movable contact arm 44 which constitutes the movable contact element of a potentiometer 45 supplied from a suitable source of unidirectional current through the supply conductors 46 and 47.

A second integration watt hour meter is also employed which is generally designated as 48 and includes a current coil 49 and a voltage coil 50. The watt hour meter 48 carries an indicating arm 51 which cooperates with a dial 52 to indicate total lateral departure to the right or to the left of the course originally established when the gyroscopes 24, 25 and 26 are set into operation.

The two current coils 43 and 49 of the watt hour meters 41 and 48 respectively are connected in series to a source of constant current 53. This flow of constant current through the current coils 43 and 49 of the watt hour meters 41 and 48 respectively represents the constant time increment, as will presently be explained in greater detail.

The movable contact arm 44 of the watt hour meter 41 is connected through a conductor 54 to one side of the voltage coil 50 of the watt hour meter 48. The center point 55 of the resistance element of the potentiometer 45 is connected through a conductor 56 to the other side of the voltage coil 50 of the watt hour meter 48.

Let it now be assumed that the above described instruments are mounted on an aircraft which is in flight. If there is neither departure of the aircraft to the right or left of the originally established course either by way of drift or by changing the heading of the aircraft and flying off course, the large mass 30 on the pendulum arm 31 remains in a position of rest or equilibrium. In this position the current supplied from the source 33' and flowing through coil 33 and the galvanometer 34 is such that the movable contact arm 35 is in its position as shown by the dotted line in Figure 5. In this position, no voltage drop occurs between conductors 39 and 42, hence no current flows through the voltage coil 40 of the watt hour meter 41 and the movable contact arm 44 is in its zero position, as shown by the broken line in Figure 5. Since there is no potential drop between the conductors 54 and 56, there is no movement of the pointer arm 51 of the watt hour meter 48. If the aircraft has remained on course up to the present time, and has neither drifted to the right nor to the left, the pointer which gives a cumulative reading will still be in its zero position, as shown by the dotted line in Figure 5.

Let it now be assumed that the aircraft now begins to drift off course. This causes movement of the mass 30 with respect to the coil 33 and changes the inductance of the circuit. The voltage drop through the galvanometer 34 will thus be changed due to the change in impedance in the circuit and this will affect movement of the movable contact arm 35. Movement of the contact arm 35 places a voltage drop across the voltage coil 40 of the watt hour meter 41 and in turn affects the movement of the movable contact arm 44. The direction of the movement of the contact arm 44 will depend upon whether the impedance of the circuit, including the coil 33, has been increased or decreased, and the extent of the movement will be a function of the extent of the movement of the armature 30. The movement of the movable contact arm 44 places a voltage drop across the voltage coil 50 of the watt hour meter 48. This in turn causes a movement of the movable indicating arm 51.

It is to be understood from the above description that the movement of the mass 30 creates a change in impedance of the coil 33 which is a function of acceleration. It will thus further be understood that the movement of the movable contact arm 35 of the galvanometer 34 is a function of acceleration. Since the current flowing through the current coils 43 and 49 of the watt hour meters 41 and 48 is maintained constant, it will be understood that the watt hour meter 41 is a means for integrating acceleration as a function of time. In this connection, the constant current flowing through the current coil 43 represents constant increments of time, or in other words, the time axis. This first integration of acceleration gives velocity. It will also be understood that the watt hour meter 48 is the integration of the velocity determined by the watt hour meter 41. Stating this in a somewhat different way, the reading obtained by the watt hour meter 48 is the double integration with respect to time of acceleration as determined by the accelerometer 27.

The functioning of one of the accelerometers in conjunction with its associated two watt hour meters is illustrated in Figure 6. The curve 54 represents a hypothetical series of movements of an aircraft carrying one of the accelerometers. The curve 55 represents the first integration of the curve 54 and shows the velocity of movement of the aircraft. The curve 56 is the second integration of the acceleration curve 54 and represents distance traveled or departure from the starting point. The portion of the acceleration curve 54 in the region from A to B represents the movement of the aircraft from the starting point in gaining speed in the direction of movement being registered by the accelerometer. At the point B it has reached a constant speed. This continues throughout the region from B to C. It will also be observed that this is represented by the flat top portion of the velocity curve 55 above the region B—C.

Referring again to the acceleration curve 54, the region from C to D shows the plane beginning to slow down and thus represents deceleration. In the velocity curve this is represented by a decrease in velocity throughout this region. In the region from D to E of the time axis the acceleration curve represents no accelerating or decelerating forces and the velocity is constant. In the region from E to G the plane is slowing down still further, and at the point F actually reverses its direction. This is represented on the velocity curve 55 by the velocity curve passing below the zero axis at the point F and hence representing a change or reversal in direction. The curve 56 is a cumulative reading in departure from the starting point. It will be noted that when the velocity curve passes through the zero axis that the departure curve 56 begins to drop off, for we are now subtracting distance due to the reversal of direction.

From the above description it will be apparent that the three accelerometers 27, 28 and 29, with their associated watt hour meter, will give a continual indication of departure to the right or left of an established course set up from a fixed starting point, the altitude which the plane has gained from the established course set up from the fixed starting point, and the total distance traveled in the direction of the established course in a horizontal plane from the fixed starting point.

Figures 7 and 8 illustrate the manner in which the system operates. As shown in Figure 7, the fixed starting point is indicated at 57. The gyrocompasses are set to establish a course represented by the long arrow 58. This arrow is in a horizontal plane and is preferably in the direction of the desired course. As the plane starts off from the starting point 57 let it be assumed that it is headed in the direction of the arrow 59. Due to drift, however, the actual path of flight of the aircraft is represented by the arrow 60. The pilot, due to the three accelerometers and their associated instruments, will, at all times know his position with respect to the established course 58. For example, if he has arrived at a point 61 he will know exactly where that point is with respect to his established course 58, and how far he has traveled.

In Figure 8 there is illustrated a plot of movement of a plane having the instruments hereinbefore described. The starting point, again, is represented by the numeral 57, while the course is represented by the arrow 58. In this case let it be assumed that the pilot wishes to reach the destination represented at 62. However, in reaching that destination he wishes to fly over intermediate points 63, 64 and 65. Before considering the intermediate points, let it be understood that in flying from the point 57 to the destination 62, it is simply necessary for the pilot to fly a total distance represented by the trip progress indicator which is the determined distance between the point 57 and the destination 62, and when the trip progress indicator has shown the distance traveled to correspond to this amount, the pilot will know that he has traveled the correct distance. He simply flies his aircraft with the end result that his departure indicator, which indicates travel to the right or left of the desired course, must equal zero when his trip progress indicator has indicated the desired total miles. His altitude indicator must, of course, be brought down to zero as he lands his plane. Thus a complete blind flying operation may be carried out from start to finish without the aid of any instruments on the ground. It will be observed further that it does not make any difference whether he continually stays on his established course during the intermediate period between his takeoff and reaching his destination, for his trip progress accelerometer measures only the component of travel parallel to the established course. For example, the pilot may fly over the intermediate point 63. The trip progress indicator will not show the total distance from the point 57 to the point 63 which the plane has traveled, but will merely show the component of that distance traveled along the course path 58. The lateral departure indicator records only the component of movement which is perpendicular to the established course 58. Thus in traveling from the intermediate point 63 to the intermediate point 62 the lateral departure indicator will first decrease its total reading until it shows zero at the point H where the craft crosses the established course 58 and then reads departure to the right of the course between H and the point 64. This is repeated again in traveling from the point 64 to the point 65. The altitude accelerometer and its associated indicating instruments simply record a component of movement perpendicular to the established course and lying in a vertical plane.

The three indicating dials for the three accelerometers 27, 28 and 29 are shown in Figure 1 at 66, 67, and 68, respectively.

While I have shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. In a navigation system for a moving vehicle, means for indicating departure from a predetermined reference point comprising a support structure mounted for movement in three planes at right angles to each other, gyroscopic mechanism mounted on said structure for maintaining it oriented in a fixed direction, thereby to establish a reference line irrespective of direction of movement of the vehicle, means for registering acceleration and deceleration in a direction fixed with respect to said reference line, a pair of watt hour meters each having a voltage coil and a current coil, said current coils being connected to a source of constant current, means for applying an electromotive force across the voltage coil of one of said watt hour meters proportional to the accelerating or decelerating forces, means for applying an electromotive force across the voltage coil of the other watt hour meter proportional to the extent of movement of the movable element of the first watt hour meter, whereby the movement of the movable element of said second watt hour meter is an indication of the component of departure of the vehicle from the reference point as measured along an axis parallel to said fixed direction of movement.

2. Means for indicating departure of a moving object from a predetermined point comprising supporting means on said object for movement about three axes at right angles to each other, gyroscopic means mounted on said supporting means and acting in three planes at right angles to each other and coincident with the planes of movement of said supporting means for maintaining the orientation of said supporting means fixed irrespective of changes in direction of movement of said object, an accelerometer including a galvanometer, a coil and a source of current connected in circuit with said galvanometer, a relatively heavy paramagnetic mass, means for suspending said mass as a pendulum from said supporting means with said mass in close proximity to said coil, whereby the impedance of said coil is changed by movement of said mass, a pair of watt hour meters associated with said accelerometer, each watt hour meter including a movable voltage coil and a current coil, means for supplying a constant current to the current coil of each of said watt hour meters, means for impressing an E. M. F. across the voltage coil of one of said meters proportional to the movement of the movable element of said galvanometer, and means for impressing an E. M. F. across the voltage coil of the other watt hour meter proportional to the movement of the movable coil of said first watt hour meter, whereby the movement of the movable coil of said second watt hour meter is an indication of the double integrated value with respect to time of the accelerating or decelerating forces acting on said mass.

GEORGE A. MANEY.

REFERENCES CITED

The following references are of record in the file of this patent:

UNITED STATES PATENTS

| Number | Name | Date |
|---|---|---|
| 1,728,904 | Herr | Sept. 17, 1929 |
| 1,840,001 | Tsujita | Jan. 5, 1932 |
| 2,338,536 | Plant-Carcasson | Jan. 4, 1944 |

FOREIGN PATENTS

| Number | Country | Date |
|---|---|---|
| 411,124 | Great Britain | May 29, 1934 |